United States Patent
Rajic

(10) Patent No.: US 11,535,533 B2
(45) Date of Patent: Dec. 27, 2022

(54) SYSTEMS AND METHODS FOR ELECTROCHEMICALLY ENHANCED WATER FILTRATION

(71) Applicant: Pioneer Valley Coral and Natural Science Institute, Amherst, MA (US)

(72) Inventor: Ljiljana Rajic, Amherst, MA (US)

(73) Assignee: ELATEQ, INC., Amherst, MA (US)

( * ) Notice: Subject to any disclaimer, the term of this patent is extended or adjusted under 35 U.S.C. 154(b) by 558 days.

(21) Appl. No.: 16/573,147

(22) Filed: Sep. 17, 2019

(65) Prior Publication Data

US 2020/0087174 A1 Mar. 19, 2020

Related U.S. Application Data

(60) Provisional application No. 62/732,258, filed on Sep. 17, 2018.

(51) Int. Cl.
| | |
|---|---|
| C02F 1/46 | (2006.01) |
| C02F 1/461 | (2006.01) |
| C02F 1/467 | (2006.01) |
| C02F 1/469 | (2006.01) |
| C02F 101/30 | (2006.01) |
| C02F 101/20 | (2006.01) |

(52) U.S. Cl.
CPC ........ *C02F 1/46109* (2013.01); *C02F 1/4672* (2013.01); *C02F 1/4691* (2013.01); *C02F 2001/46128* (2013.01); *C02F 2001/46133* (2013.01); *C02F 2101/20* (2013.01); *C02F 2101/308* (2013.01); *C02F 2201/4611* (2013.01)

(58) Field of Classification Search
CPC ...... C02F 1/46; C02F 1/72; C02F 1/48; C02F 1/32
See application file for complete search history.

(56) References Cited

U.S. PATENT DOCUMENTS 6,214,189 B1 * 4/2001 Won .......................... G21F 9/30
205/687
2017/0102016 A1 * 4/2017 Azpiroz ................. B01L 3/5027

FOREIGN PATENT DOCUMENTS

| CN | 106145469 A | * | 11/2016 | |
|---|---|---|---|---|
| WO | WO-2006048594 A1 | * | 5/2006 | ............. B01D 61/56 |
| WO | WO-2015130155 A1 | * | 9/2015 | ............ C02F 1/4672 |
| WO | WO-2016013234 A1 | * | 1/2016 | .......... C02F 1/46104 |

(Continued)

OTHER PUBLICATIONS

Nikoline Loklindt Pedersen, et al.; "Synergy of Combined Adsorption and Electrochemical Degradation of Aqueous Organics by Granular Activated Carbon Particulate Electrodes"; Separation and Purification Technology, vol. 208, Jan. 8, 2019, pp. 51-58.

(Continued)

*Primary Examiner* — Cameron J Allen
(74) *Attorney, Agent, or Firm* — Grogan, Tuccillo & Vanderleeden, LLP

(57) ABSTRACT

A system for electrochemically enhanced water filtration is provided. The system includes: a chamber plug-flow electrochemical cell; a first cathode and anode pair disposed in the cell; and a second cathode and anode pair disposed in the cell. The first and the second pair are collectively operative to apply a 2D electric field in at least one of a horizontal direction and a vertical direction with respect to the chamber plug-flow electrochemical cell.

18 Claims, 7 Drawing Sheets

(56) References Cited

FOREIGN PATENT DOCUMENTS

WO        WO-2017117117 A1 *   7/2017   .......... A61M 1/1672

OTHER PUBLICATIONS

Gwendoline Tisserant, et al.; "Generation of Metal Compositions Gradients by Means of Bipolar Electrodeposition"; Electrochimica Acta, vol. 179, Oct. 10, 2015, pp. 276-281.
Katsuki Kusakabe, et al.; "Effect of Electrolyte Properties on Current Efficiency of Bipolar Packed Bed Electrodes"; Journal of Chemical Engineering of Japan, vol. 17, No. 3,1984, pp. 293-297.
Meng Li, et al.; "Visualizing the Zero-Potential Line of Bipolar Electrodes with Arbitrary Geometry"; Analytical Chemistry, 2018, vol. 90, pp. 6390-6396.
E. Andres Garcia, et al.; "Hybrid Electrochemical-Granular Activated Carbon System for the Treatment of Greywater"; Chemical Engineering Journal, vol. 352, Nov. 15, 2018, pp. 405-411.
A.S. Koparal, et al.; "Electroadsorption of Acilan Blau Dye from Textile Effluents by Using Activated Carbon-Perlite Mixtures"; Water Environment Research, vol. 74, No. 6, Nov.-Dec. 2002, pp. 521-525.
Christian Ulrich, et al., "Potential and Current Density Distribution at Electrodes Intended for Bipolar Patterning"; Analytical Chemistry, vol. 81, No. 1, Jan. 1, 2009, pp. 453-459.
A. Ban, et al., "Fundamentals of Electrosorption on Activated Carbon for Wastewater Treatment of Industrial Effluents"; Journal of Applied Electrochemistry, vol. 28,1998, pp. 227-236.
Stephen E. Fosdick, et al., "Two-Dimensional Bipolar Electrochemistry"; American Chemical Socierty, vol. 132, No. 27, 2010, pp. 9226-9227.

* cited by examiner

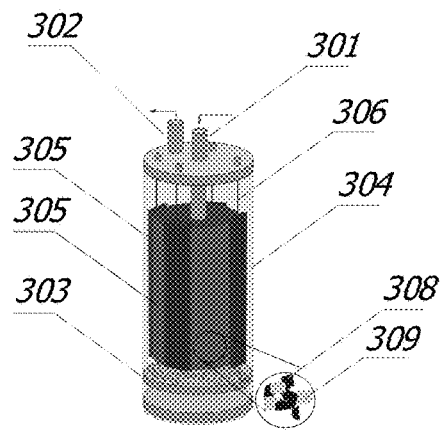
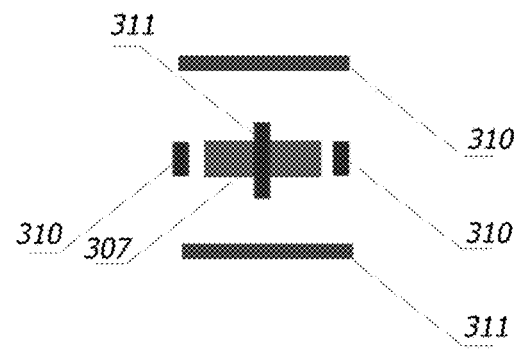
FIG. 3A
FIG. 3B
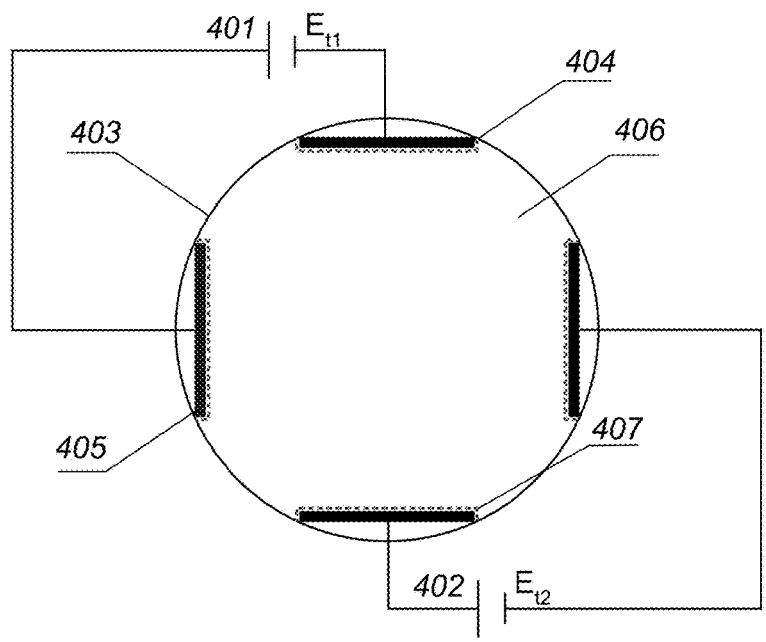
FIG. 4

SYSTEMS AND METHODS FOR ELECTROCHEMICALLY ENHANCED WATER FILTRATION

CROSS-REFERENCE TO RELATED APPLICATIONS

This application claims priority to U.S. Provisional Application No. 62/732,258 filed on Sep. 17, 2018, which is herein incorporated by reference in its entirety.

BACKGROUND

Technical Field

Embodiments of the invention relate generally to techniques for water filtration, and more specifically to systems and methods for electrochemically enhanced water filtration.

Discussion of Art

The exponential industrial growth and rapid changes in day-to-day activities of human beings has resulted in an increase in the volume and complexity of waste in the air, water and soil. Although various methods have been proposed to treat water/wastewater contaminated with organic compounds, the use of activated carbon (AC) either as powder (PAC) or granular (GAC) for the adsorption of contaminants is among the most commonly used and widely preferred method. The unique adsorption characteristics of AC depend on its specific surface area, pore structure as well as its surface functional groups. However, the adsorbent capacity to bind contaminants depletes during treatment so that porosity can become progressively saturated and inactive, which in turn, may require the spent media to be further treated (reactivation/regeneration).

Electrochemical and electrochemically-induced processes are widely studied for water treatment purposes; from heavy metals removal (electrocoagulation) and desalination (capacitive deionization) to organic pollutants oxidation and disinfection. Although electrochemical treatment has strong advantages such as: (i) no need for chemicals addition; (ii) automatic control and manipulation of water chemistry; (iii) scalability; and (iv) use of alternative power sources, technologies are yet to be developed for complete contaminant removal and simultaneous treatment of complex systems such as water containing contaminant mixtures. While some applications of three-dimensional (3D) GAC have been developed for GAC regeneration and/or support of electrochemical oxidation organic pollutants, the systems for these applications, however, only allow for generation of a bipolar system having packed beds (not isolated particles), use costly feeder electrodes, and are not suitable for simultaneous electrosorption, oxidation/reduction of pollutants and/or carbon regeneration.

What is needed, therefore, is improved systems and methods for electrochemically enhanced water filtration.

BRIEF DESCRIPTION

In an embodiment, a system for electrochemically enhanced water filtration is provided. The system includes: a chamber plug-flow electrochemical cell; a first cathode and anode pair disposed in the cell; and a second cathode and anode pair disposed in the cell. The first and the second pair are collectively operative to apply a 2D electric field in at least one of a horizontal direction and a vertical direction with respect to the chamber plug-flow electrochemical cell.

In another embodiment, a method for electrochemically enhanced water filtration is provided. The method includes applying a 2D electric field via two anode and cathode pairs disposed in a chamber plug-flow electrochemical cell. The 2D electric field is modulated in at least one of a horizontal direction and a vertical direction with respect to the cell.

In yet another embodiment, a plug-flow electrochemical reactor is provided. The plug-flow electrochemical reactor includes: a body forming a cavity; two anode and cathode pairs disposed in the cavity in a radial arrangement; a wireless 3D carbon electrode disposed in the cavity between the anodes and the cathodes of the first and the second pair; a first opening operative to introduce untreated water into the cavity; and a second opening operative to allow treated water to leave the cavity. The first and the second anode and cathode pairs are collectively operative to apply a 2D electric field in at least one of a horizontal direction and a vertical direction with respect to the cavity.

DRAWINGS

The present invention will be better understood from reading the following description of non-limiting embodiments, with reference to the attached drawings, wherein below:

FIG. 3A is a schematic diagram of an undivided plug-flow electrochemical setup with a horizontal 2D electric field for promoting a simultaneous removal processes, in accordance with an embodiment of the present invention;

FIG. 3B is a schematic diagram depicting a side view of the electrode arrangement of FIG. 3B allowing a perpendicular 2D electrical field for promoting electrosorption, in accordance with an embodiment of the present invention;

FIG. 4 is a schematic diagram depicting a top view of a 2D electric field across a 3D wireless carbon electrode in an undivided plug-flow electrochemical setup, in accordance with an embodiment of the present invention;

Figure 8A:
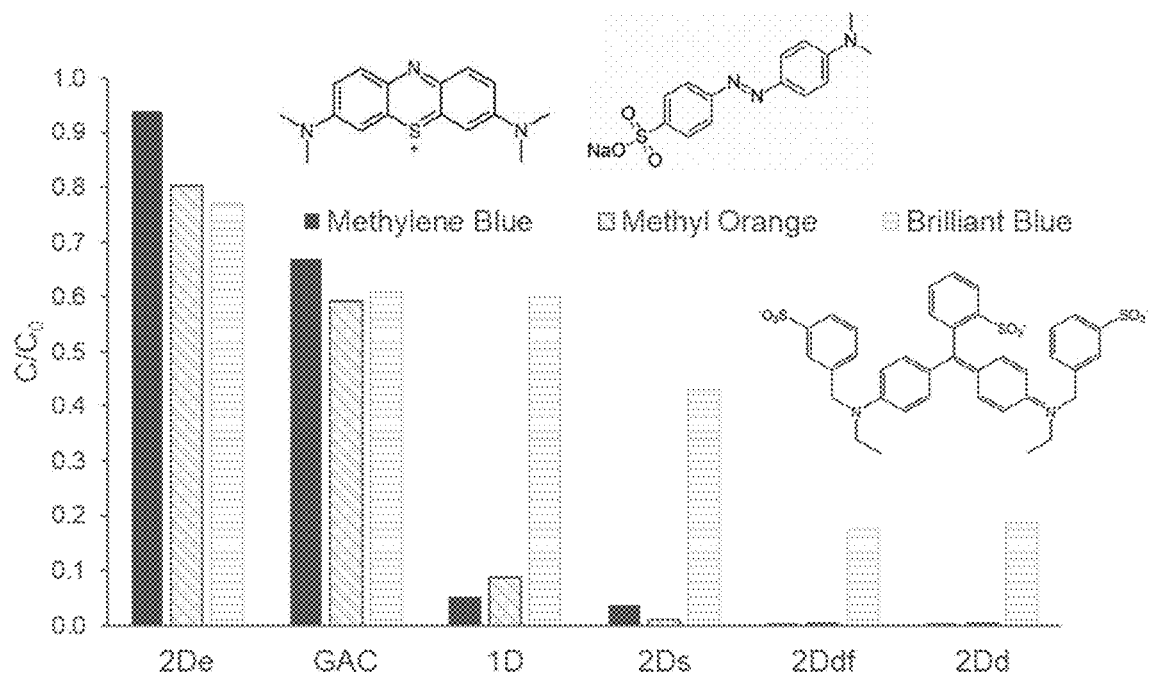
FIG. 8A is a diagram depicting the performance of a 2D electric field in the presence of a 3D wireless carbon electrode in a batch electrochemical setup for removal of Methylene Blue, Methyl Orange and Brilliant Blue FCF as model contaminants using OLC AW 12×40 mesh as the 3D wireless carbon electrode, in accordance with an embodiment of the present invention.
Figure 8B:
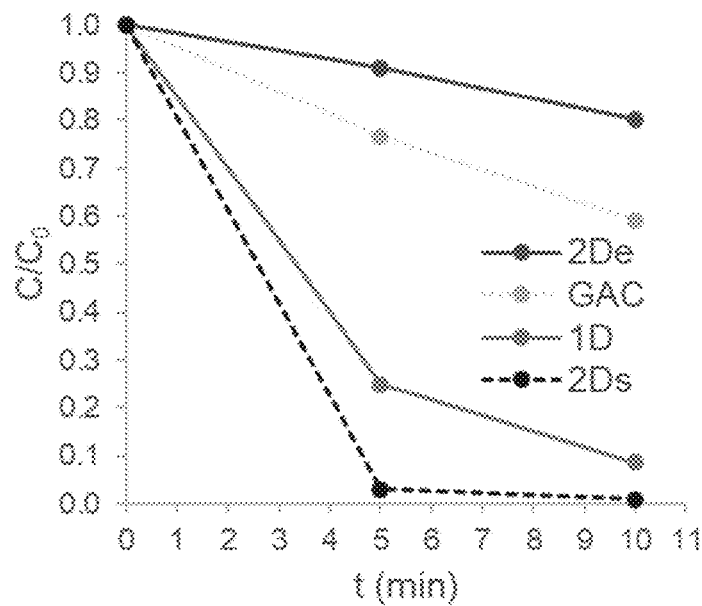
FIG. 8B is a diagram depicting kinetics for Methylene Orange removal after GAC, $2D_e$, 1D, and $2D_s$, in accordance with an embodiment of the present invention.
Figure 8C:
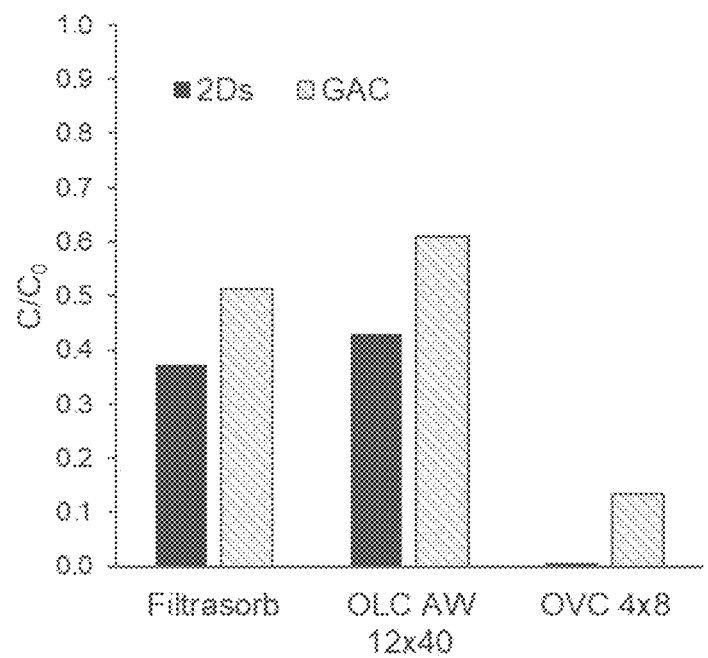
Figure 9:
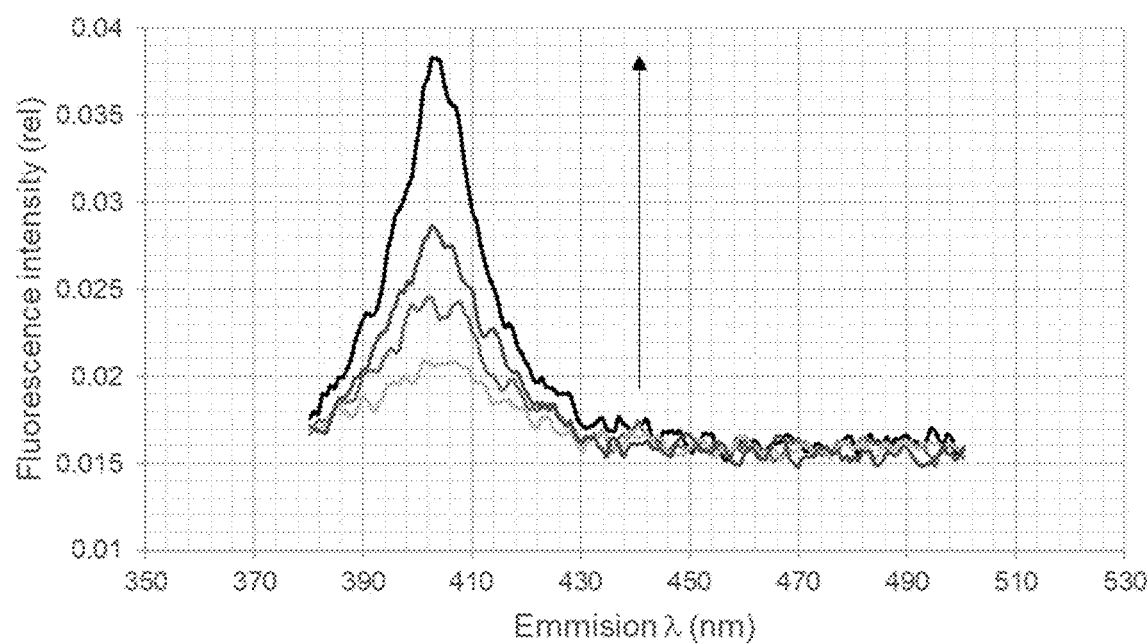

FIG. 8C is a diagram depicting the performance of a 2D electric field in the presence of a 3D wireless carbon electrode in a batch electrochemical setup for removal Brilliant Blue FCF using different 3D wireless carbon materials, in accordance with an embodiment of the present invention; and FIG. 9 is a diagram depicting $°OH$ generation during $2D_s$ at 0 min, 5 min, 10 min and 15 min under $2D_s$, as related to the electro-generation and activation of $H_2O_2$ in a batch electrochemical setup, in accordance with an embodiment of the present invention.

DETAILED DESCRIPTION

Reference will be made below in detail to exemplary embodiments of the invention, examples of which are illustrated in the accompanying drawings. Wherever possible, the same reference characters used throughout the drawings refer to the same or like parts, without duplicative description.

As used herein, the terms "substantially," "generally," and "about" indicate conditions within reasonably achievable manufacturing and assembly tolerances, relative to ideal desired conditions suitable for achieving the functional purpose of a component or assembly. The term "real-time" means a level of processing responsiveness that a user senses as sufficiently immediate or that enables the processor to keep up with an external process.

Additionally, while the embodiments disclosed herein are primarily described with respect to water treatment/purification, it is to be understood that embodiments of the invention may be applicable to other types of filtration processes involving liquids other than water.

As recognized by the present inventor, the significant capability of carbon materials for $H_2O_2$ electrogeneration via two electron oxygen reduction and activation to hydroxyl radicals (strong oxidants) creates possibilities to use this material for oxidation of various contaminants as well as disinfection. While the uses of bipolar particle carbon electrodes has been particularity limited for water treatment, as further recognized by the present inventor, however, bipolar electrochemistry offers advantages in processes such as electrocoagulation. Some specific advantages of using bipolar electrodes are the possibility for use in solutions with low electrical conductivity (e.g., groundwater) and the creation of electrode areas without a direct connection to the power source (wireless electrodes). In particular, a two-dimensional bipolar electrode (2D-BPE) may be used as, in place of, a single planar electrode in microfluidic channels for targeted use in chemical sensing or in materials synthesis and characterization. As will be understood, this concept allows for localized reactions which can be used for controlled carbon wireless electrode performance.

Accordingly, embodiments of the present invention relate to electrochemically enhanced water filtration that combine the concepts of 2D electric fields, 3D carbon electrodes arranged as a packed bed from graphite felt, GAC (or carbon foam as well as isolated GAC particles), and polarization of conductive materials in the electric field (bipolar electrochemistry). Specifically, embodiments of the invention provide a novel technique utilizing low-level 2D electric fields for polarization of wireless carbon electrodes to promote multiple reaction sites at the electrode which allows for uniform and simultaneous electrosorption and electrochemically-induced oxidation in a single chamber plug-flow electrochemical cell. The application of different 2D electric fields and/or electric field distribution within wireless electrodes, depending on their length, allows for controlling the potentials at wireless electrode reactive sites for simultaneous electrosorption and promotion of oxidation (via $H_2O_2$ generation/activation). Thus, embodiments of the present invention promote carbon material performance and longevity when used for water filtration for simultaneous removal of inorganic and organic pollutants.

Further, and as will be explained in greater detail below, embodiments of the present invention relate to methods and systems for using three-dimensional (3D) wireless carbon electrodes for water purification. More particularly, some embodiments of the present invention promote simultaneous electrosorption and electrochemically-induced reactions for removal of pollutants from water. Yet more particularly, some embodiments of the present invention relate to the use of 3D carbon electrodes arranged as packed bed of graphite felt, granular activated carbon (GAC), or carbon foam as well as isolated GAC particles arranged as wireless electrodes. Specifically, some embodiments of the present invention relate to a novel technique utilizing low-level two-dimensional (2D) electric fields for generation of wireless carbon electrodes enabling multiple reaction sites at the electrode(s) for uniform electrochemically-induced water purification in a single chamber plug-flow electrochemical cell. Thus, some embodiments of the present invention provide for enhanced performance and longevity of carbon materials used for water purification.

Figure 1:
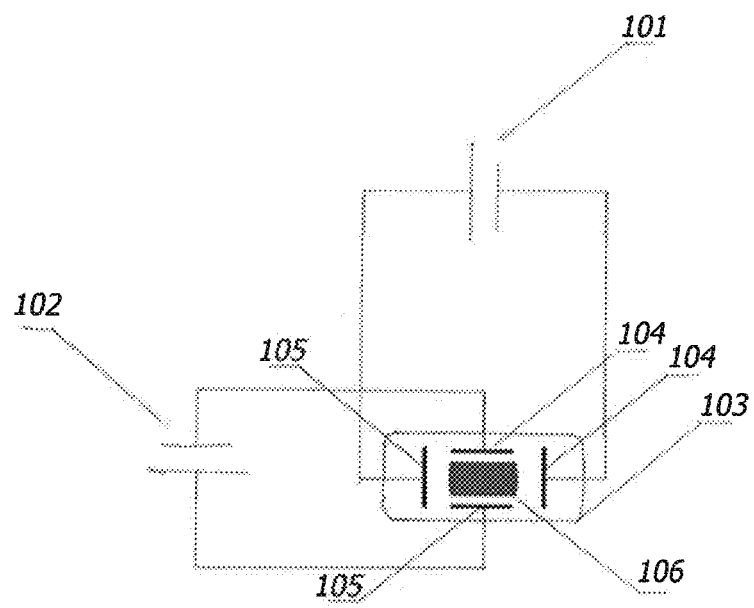
FIG. 1 is a schematic diagram of an electrochemical setup with a 2D electric field, in accordance with an embodiment of the present invention.

Referring now to FIG. 1, an electrochemical setup in accordance with an embodiment of the present invention is shown. The setup includes a wireless 3D electrode 106 where reference numerals 101 and 102 represent direct current (DC) power supplies connected to an undivided plug-flow electrochemical cell 103 containing four (4) feeder electrodes, e.g., anodes 104 and cathodes 105, which in embodiments, may be all titanium based mixed metal oxide or TiMMO, or carbon cathodes 105 with TiMMO anodes 104. As shown in FIG. 1, in embodiments, the anodes 104 and cathodes 105 are arranged in pairs, i.e., one (1) anode corresponding to (1) cathode. In embodiments, the wireless 3D carbon electrode 106 may be graphite felt, GAC, carbon foam and/or another form of modified, i.e., anodized, carbon. As will be appreciated, a 2D electric field can be applied vertically and/or horizontally across the 3D electrode bed via the electrodes 104 and 105.

Figures 2A, 2B:
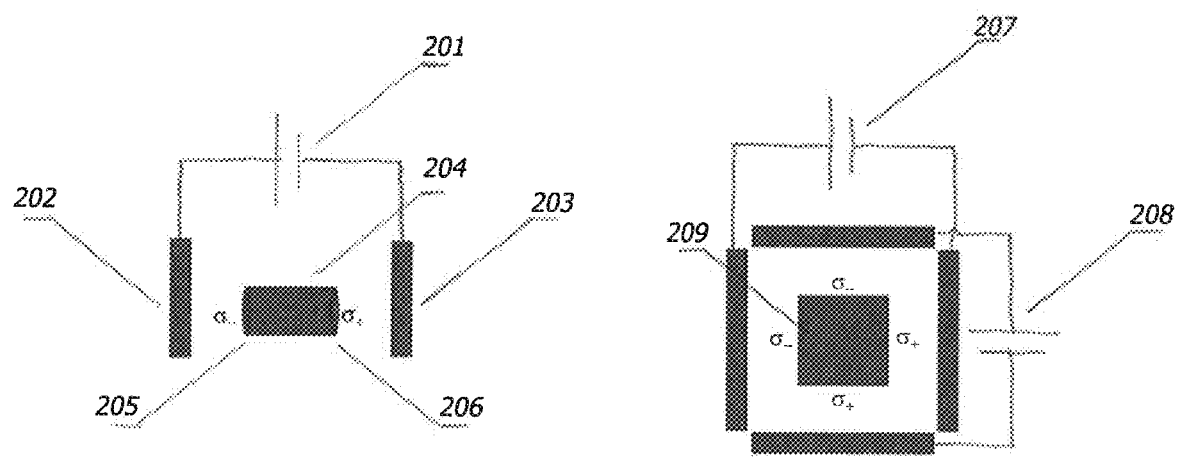
FIG. 2A is a schematic diagram of a wireless bipolar electrode in a one-dimensional (1D) electric field, in accordance with an embodiment of the present invention.
FIG. 2B is a schematic diagram of a wireless electrode in a 2D electric field, in accordance with an embodiment of the present invention.

Illustrated in FIGS. 2A and 2B is a mechanism behind a method of an embodiment of the present invention which shows the difference between bipolar electrode 204 and its charge distribution via 205 and 206 under a one dimensional (1D) electric field via 201 applied to feeder electrodes 202 and 203, and wireless electrode 209 in a 2D electric field via power sources 207 and 208. By applying different electric fields via 207 and 208 (or by varying electrode lengths), the electrodes can promote different processes such as electrosorption, as well as direct oxidation and reduction processes.

As will be appreciated, in experiments performed by the current inventor using embodiments disclosed herein, the removal efficiency of Brilliant Blue FCF as a model compound indicated negligible removal in only bipolar mode (less than 12.5%), while anodized graphite felt as wireless electrode in a 2D electric field removed more than 99% of the dye, packed bed GAC up to 93%, and particle wireless GAC up to 99.1%. Further experimentation by the current inventor using a graphitic GAC particle electrode showed enhanced performance in terms of minimizing carbon corrosion while maintaining the same dye removal efficiency (approx. 99%) under the same conditions as higher porosity GAC. Yet further experimentation by the current inventor using only inert feeder electrodes in both systems under the same currents as occur in the bipolar case, only 12.5% of the dye was removed while an even increase in current applied to the feeder electrodes (as occurs with immersing wireless electrodes) had negligible effect dye removal.

As will be understood, the contributions of systems, in accordance with embodiments of the present invention, relates to: (i) an increase in conductivity, meaning that solutions with low electrical conductivity such as groundwater can be treated using this approach; and (ii) reactions occur at the wireless electrode. Thus, embodiments of the systems disclosed herein increase the longevity of carbon material performance and show that even spent GAC can be effectively utilized as a wireless electrode (less than 5% performance decay comparing to pristine GAC). Comparing the simultaneous removal of dye and Cu ions, application of two different fields (9 V and 4 V) led to improved removal of Cu ions (75% which decreased the concentration below the drinking water maximum contaminant level) in addition to dye removal versus (90%) when equal nine (9) V electrical fields were applied to particle wireless GAC electrode (<5% of Cu removal and approx. 99% of dye removal). Lower electrical fields minimized water electrolysis and other redox reactions such as e.g., $H_2O_2$ formation at the GAC electrode, and/or allowed for improved electrosorption of Cu ions.

FIGS. 3A and 3B illustrate application of 3D wireless carbon electrodes in a plug-flow electrochemical reactor according to an embodiment of the invention. As water with pollutants enters the reactor via opening/conduit 301 (effluent leaves the reactor via opening/conduit 302 and may be dispersed via 303), it reaches the section with an electrochemical system containing feeder anodes 304 and cathodes 305 in radial arrangement, i.e., arranged around the circumference of the cell as shown in FIG. 3. In such embodiments, the electrodes 304 and 305 may all be titanium based mixed metal oxide or TiMMO, or, in other embodiments, the cathodes 305 may be carbon with the anodes 304 being TiMMO. In embodiments, the electrodes 304 and 305 may be connected to one or more DC power supplies via cable(s) 306. In this horizontal radial configuration, an additional horizontal anode/cathode pair can be set vertically to promote maximum usage of a wireless 3D electrode 307. In embodiments, the wireless 3D electrode 307 consists of plug-flow packed bed (stacked) from graphite felt, GAC, or carbon foam and/or isolated GAC particles 308 via polypropylene insulation granules 309 or other inert and electrically non-conductive particulate material forming the particulate wireless GAC electrode within the bed. As will be appreciated, use of a particulate wireless GAC electrode provides for uniform distribution of reactive sites throughout the 3D electrode. In case of stacked GAC, one may incorporate non-conductive static mixer to ensure equal distribution and mixing along all reactive sites.

In embodiments, the 3D electrode may be arranged for electrosorption (desalination, water hardness and some heavy metals removal) and include modified carbon materials (i.e. anodized). The use of anodized materials for promoting simultaneous processes may be limiting due to extensive carbon corrosion occurring at voltages higher than 1.1 V (max voltage for electrosorption without chlorine production and intensive carbon corrosion). More particularly, in embodiments, a perpendicular 2D electric field, as is FIG. 3B, may provide for electrosorption and is applicable for, e.g., desalination.

FIG. 3B further illustrates a side view of the 2D electric field with the electrode arrays set along y-axis (the y-axis/vertical being the longitudinal axis of the cell (FIG. 3A) with the x-axis/horizontal being the latitudinal axis of the cell) and radial around 307. This allows for more flexibility in the design and application of the 2D electric field for different 3D electrode materials and reactor designs. As will be understood, a perpendicular 2D electric field for promoting simultaneous processes for removal (both electrosorption and oxidation) may effect bubble formation (oxygen and hydrogen forming via water electrolysis), and entrapment in 3D electrode material, and an increase in electrical resistivity of the system.

Turning now to FIG. 4, another embodiment of the invention is shown wherein an electrochemical apparatus includes direct current (DC) power supplies 401 and 402 connected to an undivided electrochemical cell 403 made from material including but not limited to acrylic, polytetrafluoroethylene or PTFE, or polyvinyl chloride. In embodiments, cell 403 contains four (4) feeder electrodes, e.g., anode 404 and cathode 405, and a wireless 3D carbon electrode filling the cell 403 cavity 406. The feeder electrodes and their connections to 401 and 402 may be separated from wireless 3D carbon electrode in 406 using appropriate insulating electrode perforated sleeves or enclosures means 407 made from nonconductive material including but not limited to acrylic and PTFE. The perforation size on 407 is related to the GAC mesh size.

In embodiments, the feeder anode 404 is an inert electrode such as but not limited to titanium based mixed metal oxide or Ti/MMO. The feeder cathode 405 may be but not limited to Ti/MMO, pristine and/or modified carbon (felt, foam or other forms), in order to enhance oxidation process via cathodic generation of $H_2O_2$ and its activation. In embodiments, the ratio between total feeder electrodes' width and 403 diameter is kept at 1.2.

Figure 5:
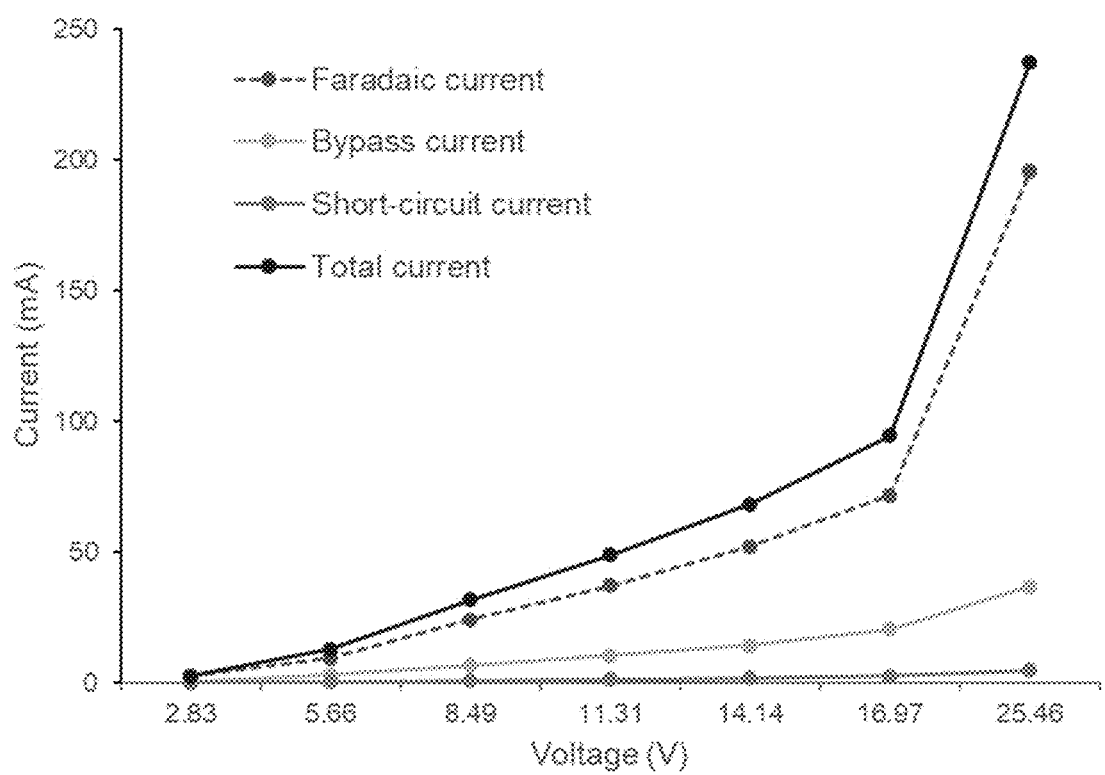
FIG. 5 is a diagram of a current distribution in a 2D batch electrochemical setup with a 3D wireless carbon electrode under equal distribution of constant voltage between feeder electrodes, in accordance with an embodiment of the present invention.

In embodiments, the wireless 3D carbon electrode is placed between feeder electrodes covering all interelectrode void or cell cavity 406. Placing the wireless 3D carbon electrode in such a manner minimizes bypass currents and/or creates effective current distribution as depicted in FIG. 5. As will be understood, this arrangement excludes occurrence of a decrease in the driving force alongside the electrode from the edge toward the middle. The 3D wireless carbon electrode can be made of pristine (original) or modified carbon materials including but not limited to carbon foam, graphite felt, and GAC, and combinations thereof.

In embodiments, $E_{t1}$ and $E_{t2}$ may be distributed among feeder electrodes as equal values or can be varied where the resulting field is the vector sum of the individual field. Variation in $E_{t1}$ and $E_{t2}$ may causes spatial variation of the interfacial potential differences between the solution and the bipolar electrode.

As will be appreciated, the electrode configuration in a 2D electric field, in embodiments of the invention, ensures uniform exposure to effective electric field across the entire packed bed wireless electrode, as compared to 1D under uniform and different values for $E_{t1}$ and $E_{t2}$. Accordingly, in embodiments, application of different voltages among feeder electrodes causes change in electric field direction, as well as non-uniform spatial distribution of potential differences in the electrolyte and consequently, between wireless electrode and electrolyte. Non-uniform spatial distribution of potential differences causes variation in driving force for particulate electrodes but also stacked 3D wireless carbon electrodes.

In the case of stacked 3D wireless carbon electrodes, similar to decrease of the driving force alongside the wireless electrode from the edge toward the middle in 1D electric field or the non-uniformity of the interfacial potential differences along the length of wireless electrode, the wireless electrode arrangement and exposure to the 2D electric field, in accordance with an embodiment of the present invention, causes changes in the driving force along the surface of the edges of the wireless electrode. In embodiments, this may influence the rates of reactions and/or limit the competition, especially related to water electrolysis versus metal deposition or other reactions with lower reduction potential values at a bipolar electrode, while allowing a wide range of voltages applicable to the feeder electrodes.

Example 1

Figure 6A:
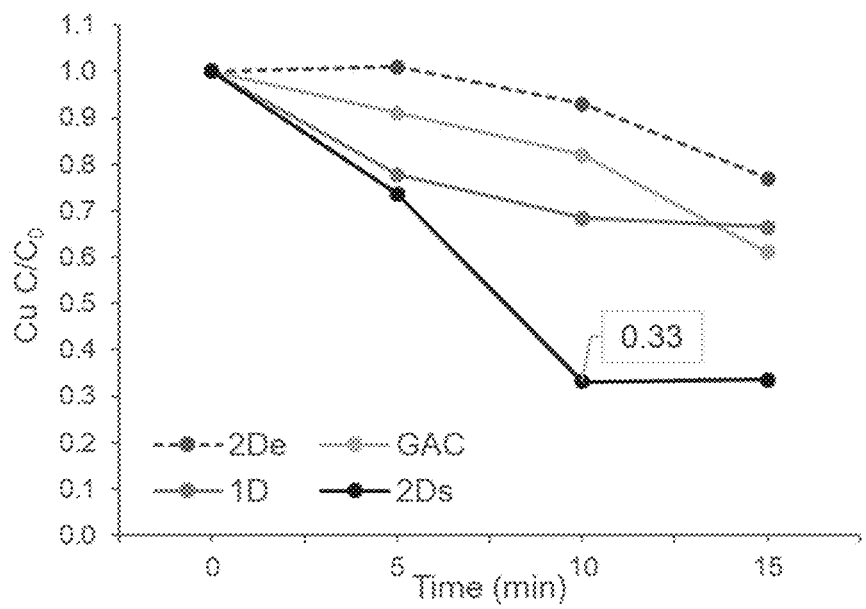
FIG. 6A is a diagram depicting the performance of a 2D electric field in the presence of a 3D wireless carbon electrode for removal of copper ions as individual containment, in accordance with an embodiment of the present invention.
Figure 6B:
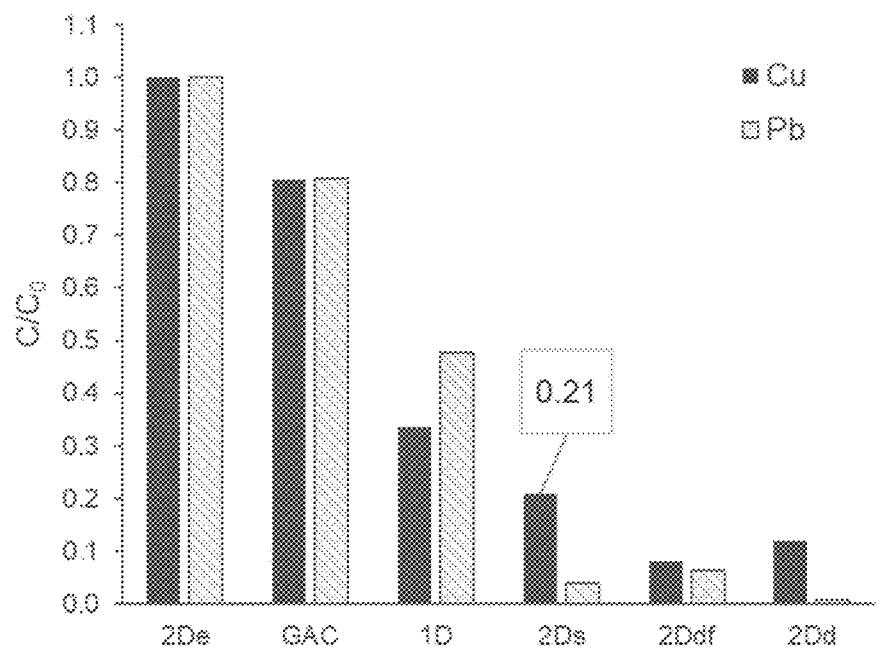
FIG. 6B is a diagram depicting the performance of a 2D electric field in the presence of a 3D wireless carbon electrode for removal of lead ions in a batch electrochemical setup, in accordance with an embodiment of the present invention.

The arrangement depicted in FIG. 4 has been employed for removal of copper ions (5 mg L$^{-1}$) as individual contaminant (FIG. 6A) as well as in the presence of lead ions as co-contaminants (1 mg L$^{-1}$) (FIG. 6B). Sodium sulfate was used as electrolyte (30 mL) with ionic strength of the solution being kept constant in all applications. An example of carbon material used in this example of the application of this invention was 20.00 g of GAC, OLC AW 12×40 mesh.

FIG. 6A presents the changes of copper ions concentration during sorption by GAC, application of 2D field without (2D$_e$) as well as in the presence of 3D wireless carbon electrode (2D$_s$). Similarly, performance was compared with application of 1D electric field in presence of 3D wireless carbon electrode where total surface area of feeder anode and cathode were kept constant in all applications. The voltage was maintained constant at seven (7) V while voltages distributed to feeder electrodes in 2D field application varied. As defined above, the following scenarios were compared: $E_{t1}=E_{t2}=5$ V in 2D$_e$ and 2D$_s$, $E_{t1}=6.12$ V and $E_{t2}=3.40$ V in 2D$_{df}$, and $E_{t1}=5.37$ V and $E_{t2}=4.50$ V in 2 D$_d$. The vector sum of the individual fields was maintained constant.

In addition to data presented in FIGS. 6A and 6B, the current intensity nearly doubles comparing 2D$_s$ to 2D$_e$ and 1D. This confirms the fact that the 3D wireless carbon electrode, in embodiments, supports additional current pathways, meaning that Faradaic reactions occur at the poles of the wireless electrodes. These findings support the application of this invention to electrolytes with a wide range of electrical conductivity, starting as low as 400 μS cm$^{-1}$.

FIG. 6A shows the superior performance of 2D$_s$ comparing to 1D, 2D$_e$, and GAC. Also, as FIG. 6B indicates, lead as co-contaminant has no influence on copper removal efficiency under 2D$_s$ while efficiency decreased by 50% under 1D. Comparing all tested conditions, 2D$_d$ ($E_{t1}=5.37$ V and $E_{t2}=4.50$ V) significantly decreased the amount of both copper (88%) and lead (99%) after only 10 minutes of treatment.

In one experiment performed by the current inventor, a graphite plate wireless electrode (0.6 cm wide and 3.2 cm long) was used as a probe to estimate the distribution of the solution potential along the edges of wireless electrode using the arrangement depicted in FIG. 4. The voltage between a tip of Ag/AgCl reference electrode and the wireless electrode surface was measured at different positions, 0.5 mm distance from the surface. The interfacial potential differences were tested at three (3) segments of cathodic edges (P1, P2 and P3) of the graphite wireless electrode. The reference electrode was placed on the holder to precisely position the tip.

Figure 7A:
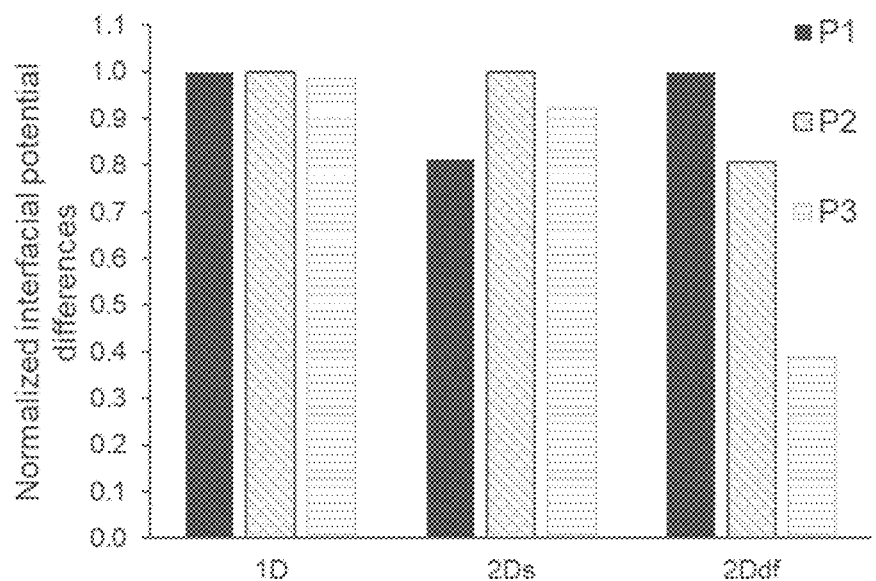
FIG. 7A is a diagram depicting variation of interfacial potential differences between the edges of a wireless graphite electrode used as a probe and electrolytes in 1D, $2D_s$, and $2D_{df}$, in accordance with an embodiment of the present invention.

FIG. 7A illustrates the variation of interfacial potential differences between the edges of the wireless electrode and electrolyte under 1D, 2D$_s$, 2D$_{df}$ and 2D$_d$ (as described before). As shown, the interfacial potential differences remained constant under 1D electric field, while the 2D field shows non-uniform distribution depending on $E_{t1}$ and $E_{t2}$ values. Under 2D$_s$, P1 and P2 vs. P3 experienced different values while under 2D$_{df}$ each segment experienced different values depending on its position in the electric field.

Figure 7B:
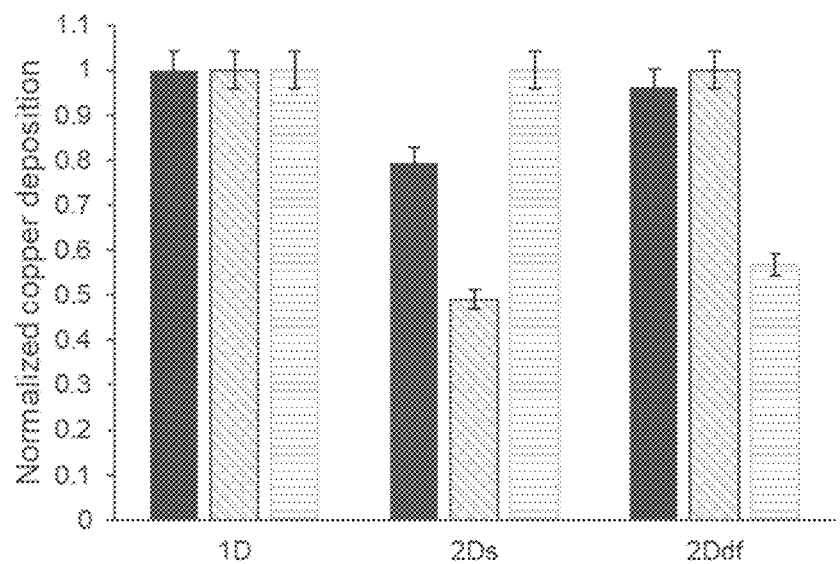
FIG. 7B is a diagram depicting the distribution of copper along cathodic edges of a 3D wireless carbon (GAC) electrode in 1D, $2D_s$, and $2D_{df}$ using batch electrochemical setup, in accordance with an embodiment of the present invention.

As an example of variation in metal distribution along the edges of a 3D wireless carbon electrode, FIG. 7B illustrates normalized values of accumulated copper at each segment of the cathodic side of the 3D wireless carbon electrode, respectively. The distribution of copper within the 3D wireless carbon electrode was tested at three (3) segments of the cathodic sides of the 3D wireless carbon electrode defined as P1, P2 and P3. The significant difference (p<0.05) in the metal accumulation pattern and the relative amount was determined by X-ray fluorometer after each treatment, denoted earlier as GAC, 1D, 2D$_e$ and 2D$_{df}$. Comparison to GAC was conducted to eliminate the contribution of sorption only. The pattern of distribution in 1D indicates uniform distribution along the segments but total amounts of accumulated copper after 1D were only 27% than that of 2D$_s$ and 2D$_{df}$. This is mostly due to competition with water electrolysis as preferred reaction under employed potential differences at the wireless electrode surface. There was no accumulated copper at P2 after 2D$_s$ while no deposition occurred at P3 after 2D$_{df}$ (comparing to sorption only). However, accumulation occurs at P1 and P3 after 2D$_s$, and P1 and P2 after 2D$_{df}$ with 30% more copper accumulated after 2D$_s$ than 2D$_{df}$. Giving the applied values of $E_{t1}$ and $E_{t2}$ in the given example, it proposed that the main mechanism of copper removal was related to electrodeposition.

As will be understood, in embodiments, ealectrosorption plays a significant role as a removal mechanism in the proposed arrangement. For example, measuring the changes in conductivity of sodium sulfate solution under 1D, 2D$_e$, sorption by GAC and 2D$_s$ indicated the following. After 10 minutes of treatment, effluent shows up to 30% and 40% decline in initial conductivity of 1238 μS/cm under 1D and 2D$_s$, respectively, compared to up to 10% in the case of sorption by GAC and 2D$_e$. This effect was tested for sodium chloride solution under 15 mS cm$^{-1}$, referring to brackish water. Under 2D$_s$ where the applied $E_{t1}$ and $E_{t2}$ were 1.2 V (to avoid anodic oxidation of chloride), conductivity decreased by 35%, indicating possibility of using the embodiment of this invention for salt/brackish water desalination. Depending on the applied values of $E_{t1}$ and $E_{t2}$, electrosorption can preferably occur at certain segments of wireless carbon electrode.

Example 2

In yet another experiment performed by the current inventor, an arrangement as depicted in FIG. 4 was used for removal of Methylene Blue, Methyl Orange, and Brilliant Blue FCF used as model compounds representing examples of organic contaminants each at concentration of 2 mg $L^{-1}$. Sodium sulfate was used as electrolyte (30 mL) with the ionic strength of the solution being kept constant in all applications. An example of carbon material used in this example of the application of this invention was 20.00 g of: OLC AW 12×40 mesh, Filtrasorb and OVC 4×8 mesh (Calgon Carbon).

FIGS. 8A and 8B depict declines in model compounds concentration during sorption by GAC, $2D_e$, 1D, $2D_s$, $2D_{df}$ and $2D_f$, as previously described, while FIG. 8C illustrates the removal efficiency of Brilliant Blue FCF by solely GAC sorption and $2D_s$ using different carbon materials. It is evident that the bipolar effect significantly enhances removal of all selected model compounds using a OLC AW 12×40 mesh after ten (10) min minutes of treatment. For example, comparing GAC to 1D and all 2D applications, removal efficiency increased by 90% and more than 99% for each model compound, respectively. FIG. 8B further illustrates kinetics of Methyl Orange removal with initial concentration of ten (10) mg $L^{-1}$ where $2D_s$ shows enhanced rate of reaction comparing to $2D_e$, GAC, and 1D.

The enhanced performance of a wireless electrode in a 2D electric field was also proven by employing Filtrasorb saturated with Brilliant Blue FCF as the wireless electrode. After ten (10) min of applying 2D electric field, >99% of dye added in the electrolyte was removed. The performance negligibly decreased (<5%) after five (5) cycles of saturation followed by application of a 2D electric field. Gathered data indicates the increased longevity of carbon when used, in accordance with embodiments of the present invention, for simultaneous removal of inorganic and organic contaminants.

Additionally, in embodiments, the arrangement depicted in FIG. 4 employs sorption and electrosorption as a contaminant removal mechanisms as well as electrochemically-induced oxidation. The oxidation process is mainly induced by $H_2O_2$ generation via oxygen two electrode reduction at cathodic edges of 3D wireless carbon electrode and further activation supported by carbon. Semi-quantitative determination of hydroxyl radical (°OH) presence was conducted using benzoic acid (BA) as a chemical probe. BA gets hydroxylated to salicylic acid (SA) by the hydroxyl radicals, which was measured by spectrofluorometer via excitation set at 405 nm.

As an example, FIG. 9 shows the SA emission peak during $2D_s$ under conditions as previously described using arrangement depicted in FIG. 4 in the electrolyte contained ten (10) mM BA in addition to sodium sulfate. The emission peak for SA increases with time indicating °OH generation increase that is directly related to the electro-generation and activation of $H_2O_2$. Due to complex nature of mechanism under $2D_s$ leading to BA and SA sorption/electrosorption within 3D wireless carbon electrode, the presented values for °OH are only to indicate the trend but do not reflect the absolute values of generated °OH.

TABLE 1 (below) summarizes percentages of removal of Methylene Blue, copper and lead ions as individual contaminants as well as co-contaminant mixture under same initial concentrations in sodium sulfate electrolyte in plug-flow electrochemical system under two (2) mL $min^{-1}$ flow. Based on the data, it is evident that presence of co-contaminants has no effect on removal of Methylene Blue under all 2D tested conditions. Similarly, the removal efficiency of copper and lead ions maintained in the presence of co-contaminants, which indicates that a 3D wireless carbon electrode under a 2D electric field enables high surface area for coupled removal mechanisms.

TABLE 1

| Setup | Methylene Blue (%) | Methylene Blue (%) with co-contaminants | Cu (%) | Cu (%) with co-contaminants | Pb (%) | Pb (%) with co-contaminants |
|---|---|---|---|---|---|---|
| $2D_s$ | 96.3 | >99.0 | 79.0 | 85.0 | 96.0 | 96.0 |
| $2D_{df}$ | >99.0 | >99.0 | 82.0 | 91.5 | 94.0 | 95.8 |
| $2D_d$ | >99.0 | >99.0 | 88.0 | 85.4 | >99.0 | >99.0 |

Finally, it is to be understood that the systems disclosed herein may include the necessary electronics, software, memory, storage, databases, firmware, logic/state machines, microprocessors, communication links, displays or other visual or audio user interfaces, printing devices, and any other input/output interfaces to perform the functions described herein, e.g., mechanization or automation, and/or to achieve the results described herein, which may be executed in real-time. For example, as stated above, the systems may include at least one processor and system memory/data storage structures in the form of a controller that electrically communicates with one or more of the components of the systems. Additionally, a software application that provides for control over one or more of the various components of the systems may be read into a main memory of the at least one processor from a computer-readable media.

It is further to be understood that the above description is intended to be illustrative, and not restrictive. For example, the above-described embodiments (and/or aspects thereof) may be used in combination with each other. Additionally, many modifications may be made to adapt a particular situation or material to the teachings of the invention without departing from its scope.

For example, in an embodiment, a system for electrochemically enhanced water filtration is provided. The system includes: a chamber plug-flow electrochemical cell; a first cathode and anode pair disposed in the cell; and a second cathode and anode pair disposed in the cell. The first and the second pair are collectively operative to apply a 2D electric field in at least one of a horizontal direction and a vertical direction with respect to the chamber plug-flow electrochemical cell. In certain embodiments, the system further includes a wireless 3D carbon electrode disposed in the cell between the anodes and the cathodes of the first and the second pair. In certain embodiments, the system further includes a first power source electrically coupled to the first anode and cathode pair; and a second power source electrically coupled to the second anode and cathode pair. In certain embodiments, the first anode and cathode pair is disposed substantially perpendicular to the second anode and cathode pair. In certain embodiments, the cathodes of the first and the second pair each include carbon. In certain embodiments, the anodes of the first and the second pair each include TiMMO. In certain embodiments, the anodes and the cathodes of the first and the second pair each include a titanium based mixed metal oxide.

Yet another embodiment provides for a method for electrochemically enhanced water filtration. The method includes applying a 2D electric field via two anode and cathode pairs disposed in a chamber plug-flow electrochemical cell. The 2D electric field is modulated in at least one of a horizontal direction and a vertical direction with respect to the cell. In certain embodiments, a wireless 3D carbon electrode is disposed in the cell between the anodes and the cathodes of the first and the second pair. In certain embodiments, the method further includes modulating a first electrical current flowing through a first pair of the two anode and cathode pairs via a first electrical power source electrically coupled to the first pair; and modulating a second electrical current flowing through a second pair of the two anode and cathode pairs via a first electrical power source electrically coupled to the second pair. In certain embodiments, the first and the second anode and cathode pairs are disposed substantially perpendicular to each other. In certain embodiments, the cathodes of the first and the second pair each include carbon. In certain embodiments, the anodes of the first and the second pair each include TiMMO. In certain embodiments, the anodes and the cathodes of the first and the second pair each comprise a titanium based mixed metal oxide. In certain embodiments, the applied 2D electric field is generated by one or more voltages each less-than-or-equal-to 1.1 V.

Still yet another embodiment provides for a plug-flow electrochemical reactor. The plug-flow electrochemical reactor includes: a body forming a cavity; two anode and cathode pairs disposed in the cavity in a radial arrangement; a wireless 3D carbon electrode disposed in the cavity between the anodes and the cathodes of the first and the second pair; a first opening operative to introduce untreated water into the cavity; and a second opening operative to allow treated water to leave the cavity. The first and the second anode and cathode pairs are collectively operative to apply a 2D electric field in at least one of a horizontal direction and a vertical direction with respect to the cavity. In certain embodiments, wherein the two anode and cathode pairs are disposed substantially perpendicular to each other. In certain embodiments, the wireless 3D carbon electrode comprises of an modified (i.e. anodized) carbon material. In certain embodiments, the modified carbon material is at least one of graphite felt, GAC and carbon foam. In certain embodiments, the applied 2D electric field is generated by one or more voltages each less-than-or-equal-to 1.1 V.

Accordingly, some embodiments of the present invention may provide for environmentally friendly, affordable, uniform and easy to control electrochemically enhanced water filtration by combining the concepts of low-level 2D electric field, 3D carbon electrodes and bipolar electrochemistry.

Further, some embodiments of the present invention may provide for simultaneous electrosorption and oxidation by using affordable materials such as carbon especially applicable for solutions with low electrical conductivity.

While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, terms such as "first," "second," "third," "upper," "lower," "bottom," "top," etc. are used merely as labels, and are not intended to impose numerical or positional requirements on their objects. Further, the limitations of the following claims are not written in means-plus-function format and are not intended to be interpreted as such, unless and until such claim limitations expressly use the phrase "means for" followed by a statement of function void of further structure.

This written description uses examples to disclose several embodiments of the invention, including the best mode, and also to enable one of ordinary skill in the art to practice the embodiments of invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

Since certain changes may be made in the above-described invention, without departing from the spirit and scope of the invention herein involved, it is intended that all of the subject matter of the above description shown in the accompanying drawings shall be interpreted merely as examples illustrating the inventive concept herein and shall not be construed as limiting the invention.

The invention claimed is:

1. A system for electrochemically enhanced water filtration, the system comprising:
   a chamber plug-flow electrochemical cell;
   a first cathode and anode pair disposed in the cell;
   a second cathode and anode pair disposed in the cell; and
   a wireless 3D carbon electrode disposed in the cell between the anodes and the cathodes of the first and the second pair;
   wherein the first and the second pair are collectively operative to apply a 2D electric field in at least one of a horizontal direction and a vertical direction with respect to the chamber plug-flow electrochemical cell.

2. The system of claim 1 further comprising:
a first power source electrically coupled to the first anode and cathode pair; and
a second power source electrically coupled to the second anode and cathode pair.

3. The system of claim 1, wherein the first anode and cathode pair is disposed substantially perpendicular to the second anode and cathode pair.

4. The system of claim 1, wherein the cathodes of the first and the second pair each comprise carbon.

5. The system of claim 4, wherein the anodes of the first and the second pair each comprise a titanium-based mixed metal oxide.

6. The system of claim 1, wherein the anodes and the cathodes of the first and the second pair each comprise a titanium-based mixed metal oxide.

7. A method for electrochemically enhanced water filtration, the method comprising:
applying a 2D electric field via two anode and cathode pairs disposed in a chamber plug-flow electrochemical cell;
wherein the 2D electric field is modulated in at least one of a horizontal direction and a vertical direction with respect to the cell; and
wherein a wireless 3D carbon electrode is disposed in the cell between the anodes and the cathodes of the first and the second pair.

8. The method of claim 7 further comprising:
modulating a first electrical current flowing through a first pair of the two anode and cathode pairs via a first electrical power source electrically coupled to the first pair; and
modulating a second electrical current flowing through a second pair of the two anode and cathode pairs via a first electrical power source electrically coupled to the second pair.

9. The method of claim 7, wherein the first and the second anode and cathode pairs are disposed substantially perpendicular to each other.

10. The method of claim 7, wherein the cathodes of the first and the second pair each comprise carbon.

11. The method of claim 7, wherein the anodes of the first and the second pair each comprise a titanium-based mixed metal oxide.

12. The method of claim 7, wherein the anodes and the cathodes of the first and the second pair each comprise a titanium-based mixed metal oxide.

13. The method of claim 7, wherein the applied 2D electric field is generated by one or more voltages each less-than-or-equal-to 1.1 V.

14. A plug-flow electrochemical reactor comprising:
a body forming a cavity;
two anode and cathode pairs disposed in the cavity in a radial arrangement;
a wireless 3D carbon electrode disposed in the cavity between the anodes and the cathodes of the first and the second pair;
a first opening operative to introduce untreated water into the cavity; and
a second opening operative to allow treated water to leave the cavity;
wherein the first and the second anode and cathode pairs are collectively operative to apply a 2D electric field in at least one of a horizontal direction and a vertical direction with respect to the cavity.

15. The plug-flow electrochemical reactor of claim 14, wherein the two anode and cathode pairs are disposed substantially perpendicular to each other.

16. The plug-flow electrochemical reactor of claim 14, wherein the wireless 3D carbon electrode comprises of carbon material.

17. The plug-flow electrochemical reactor of claim 16, wherein the carbon material is at least one of graphite felt, granular activated carbon (GAC), and carbon foam.

18. The plug-flow electrochemical reactor of claim 14, wherein the applied 2D electric field is generated by one or more voltages each less-than-or-equal-to 1.1 V.

* * * * *